US012770365B2

(12) United States Patent
Novid et al.

(10) Patent No.: US 12,770,365 B2
(45) Date of Patent: Oct. 20, 2026

(54) PACKAGE SIMILARITY SEARCH FOR LOST ITEM IDENTIFICATION

(71) Applicant: SICK Product & Competence Center Americas, LLC, Minneapolis, MN (US)

(72) Inventors: Emahn Novid, Oakland, CA (US); Alexander Shteinfeld, Chestnut Hill, MA (US)

(73) Assignee: SICK Product & Competence Center Americas, LLC, Minneapolis, MN (US)

( * ) Notice: Subject to any disclaimer, the term of this patent is extended or adjusted under 35 U.S.C. 154(b) by 195 days.

(21) Appl. No.: 18/887,089

(22) Filed: Sep. 17, 2024

(65) Prior Publication Data

US 2026/0080660 A1 Mar. 19, 2026

(51) Int. Cl.

| | |
|---|---|
| ***G06V 10/74*** | (2022.01) |
| ***G06Q 10/0833*** | (2023.01) |
| ***G06V 10/82*** | (2022.01) |
| ***G06V 30/224*** | (2022.01) |

(52) U.S. Cl.

CPC ....... *G06V 10/761* (2022.01); *G06Q 10/0833* (2013.01); *G06V 10/82* (2022.01); *G06V 30/224* (2022.01)

(58) Field of Classification Search

USPC .......................................................... 382/103

See application file for complete search history.

(56) References Cited

U.S. PATENT DOCUMENTS

| | | | | |
|---|---|---|---|---|
| 2019/0095744 | A1 | 3/2019 | Hager et al. | |
| 2020/0084519 | A1* | 3/2020 | Pappu | H04N 21/8405 |
| 2020/0089802 | A1* | 3/2020 | Ronen | G06V 40/16 |
| 2020/0211220 | A1* | 7/2020 | Ilic | G06F 18/214 |
| 2024/0153239 | A1 | 5/2024 | Chen et al. | |

FOREIGN PATENT DOCUMENTS

WO 2023101679 A1 6/2023

OTHER PUBLICATIONS

Nguyen, et al.; "Affordance-based robot object retrieval"; Published online: Aug. 30, 2021 Autonomous Robots (2022) 46:83-98 https://doi.org/10.1007 /s10514-021-10008-7.

Radford, Alec, et al. "Learning transferable visual models from natural language supervision." International conference on machine learning. PMLR, 2021.

Y. Li, J. Yu, Z. Cai and Y. Pan, "Cross-modal Target Retrieval for Tracking by Natural Language," 2022 IEEE/CVF Conference on Computer Vision and Pattern Recognition Workshops (CVPRW), New Orleans, LA, USA, 2022, pp. 4927-4936, doi: 10.1109/CVPRW56347.2022.00540.

* cited by examiner

*Primary Examiner* — Nigar Chowdhury

(74) *Attorney, Agent, or Firm* — Nath, Goldberg & Meyer; Jerald L. Meyer

(57) ABSTRACT

A first object out of a plurality of objects that have passed an object handling system is identified. To that end, image embeddings of images of the plurality of objects are generated by a multimodal object finder model that includes at least one neural network. A first object description text describing the first object is passed to the multimodal object finder model to generate a text embedding. Using a similarity search, a most similar image embedding among the image embeddings that is most similar to the text embedding is found, and a corresponding image and/or a text is output.

17 Claims, 4 Drawing Sheets

PACKAGE SIMILARITY SEARCH FOR LOST ITEM IDENTIFICATION

BACKGROUND

Field

The disclosure of the present patent application relates to package handling systems, and particularly identifying an object out of several other objects. The disclosure of the present patent application further relates to, for example, efficiently performing image retrieval to locate and identify high-value, lost packages in large-scale package handling systems.

Description of Related Art

It is common for a package to be lost in a package handling system. In such situations, the lost package is supposed to be identified in the plurality of packages managed by the package handling system. A description of the lost package is therefore sent by the customer to the company responsible for package handling; e.g., by email. Typical handling systems are configured to receive the customer message. The handling system may also be configured to exchange data; e.g., image data of handled packages via a cloud or any other web-based process. For retrieval of the lost package, a customer may therefore use a mobile phone, for example, for posting a lost item message on the company's website to describe the lost package. It is then necessary to perform an efficient search within the available data; e.g., the image data of handled packages obtained by the one or more package handling systems. The data may include images of individual packages and/or of plurality of packages sorted by the handling systems; e.g., camera data from a conveyor belt of the handling systems. The data is then evaluated using the customer's description of the lost package provided on the website.

Conventional package tracking systems typically use barcodes, radio frequency identification (RFID) tags, or text-based labels to identify and retrieve a lost package. These methods have limitations in performing image retrieval based on visual appearance, for example when package labels are missing or damaged. Some systems for package retrieval employ image recognition techniques, but often lack the capability to perform cross modal retrieval using textual descriptions. Although manual searching may be employed, manual searching is time-consuming and prone to human error. Text-based matching may fail when labels are missing, damaged or obscured.

Thus, a package similarity search for lost item identification solving the aforementioned problems is desired.

SUMMARY

A system and method for providing a package similarity search for lost item identification is provided and is capable of cross modal retrieval using textual descriptions and images of the packages. In a computer-implemented method for providing an identification of a first object out of a plurality of objects that have passed an object handling system, image embeddings of images of the plurality of objects are generated by a multimodal object finder model that includes at least one neural network. A first object description text describing the first object is provided, and the first object description text is passed to the multimodal object finder model to generate a text embedding for the first object description. A similarity search between the text embedding and the image embeddings is performed in an embedding space of the multimodal object finder model. The similarity search identifies a most similar image embedding among the image embeddings that is most similar to the text embedding for the first object description. An image and/or text corresponding to the most similar image embedding is output as the identification for the first object.

As an example, an object to be identified may be an item, a parcel or a package for mailing, luggage on airport conveyor belts, or generally an object that is moving on a conveyor belt. Thus, the "first object" may be an object that was lost during transport on a conveyor belt, a package lost during sorting in a package handling system, or luggage lost during sorting in a luggage handling system, for example. In these examples, the "object handling system" is a package handling system or a luggage handling system.

The multimodal object finder model is a type of neural network or a plurality of neural networks designed to process and integrate multiple types of data, or "modalities"; i.e., data coming from different sources or formats, such as image data paired with text data, in other words, visual modality paired with a description; i.e. textual modality.

In order to integrate the different modalities provided, image embeddings or feature vectors are generated by the neural network, which may be a convolutional neural network (CNN) or vision transformer (ViT), as non-limiting examples, and which includes an image encoder. Further, a text embedding or a feature vector of the text describing the first object is generated by the neural network, which therefore further includes a text encoder, or which is a further neural network; e.g., a text encoder that processes the text data into a vector representation; i.e., into the feature vector.

As used herein, an "embedding" is understood to be a transformation of data into a continuous vector space. The multimodal object finder model maps the images and the first object description provided into the embedding space, where similar data is close to each other regardless of their modality; i.e., images of objects are close to text describing the objects in the images. The goal is that the multimodal embedding space represents a single, coherent representation that captures the relevant features from the visual and textual modalities.

The generation of the image embeddings may include a step of pre-processing the images provided; e.g., by cropping the images. The multimodal object finder model is designed to identify the first object (i.e., a lost object) from a plurality of objects using the first object description. To identify the lost object, the multimodal object finder model therefore performs a similarity search on the multimodal embedding space, which is a multimodal vector database.

To find the most similar object compared to the first object, a similarity search is performed, after the text describing the first object has been transformed into the text embedding; e.g., by tokenizing the description of the lost package and passing it through a text encoder to generate the text embedding. The similarity search can be performed using a cosine similarity and/or a k-nearest neighbors' algorithm (k-NN). As a result, for example, the aggregated package feature vectors closest to the lost package's text embedding are found and output by the multimodal object finder model.

The identification of the first object can also include the localization of the first object. The images provided can therefore each have a time stamp and/or a reference to the object handling system; e.g., to a package handling system.

The time stamp and the reference can be present on the text label and/or on the image as such. The lost parcel can be localized using the time stamp and the reference to the package handling system. Additionally, localizing can be enhanced by combining computer vision-based object detection and tracking with other tracking technologies, such as RFID or GPS.

In a further aspect, more modalities than the actual text modality of the search query (i.e., the first object description) are implemented into the method. Such modalities can be point-clouds or query images for image-to-image comparison. For example, in addition to the first object description, an image of the object being searched for can also be read into one of a first, second input unit.

The present method advantageously enables efficient, automated cross-modal retrieval of lost packages using text descriptions. Further, because retrieval of the first object is based on the multimodal model (i.e., a text description and images), the present method is also robust in cases where package tags are missing, damaged or obscured, even in challenging scenarios with occlusions. The high degree of automation significantly increases accuracy and speed compared to manual or text-only searching methods. Finally, the present method is scalable; i.e., it can be applied to large package handling systems with high volumes of items without modifications. The method can be a web-based application and/or based on a cloud, enabling the method to access packaging systems at different locations, for example to exchange data, or enabling the method to be used from different locations.

In a first aspect of the method, the images of the plurality of objects are captured by an optoelectronic sensor of the object handling system. As a non-limiting example, an optoelectronic sensor may include a camera (e.g., a RGB camera), a LIDAR sensor, and/or a neuromorphic camera, configured to capture tags on a package and to identify, track and sort the package accordingly. The images may additionally serve as training images to train the multimodal object finder model, in particular after deployment of the multimodal object finder model, to fine-tune the model after pre-training to the specific application.

The optoelectronic sensor captures images of the objects, such that an image shows a single object or several objects. Advantageously, the optoelectronic sensor captures images of the same object from different perspectives, or several optoelectronics sensors are provided for capturing images of the same object from different perspectives, such that ideally each object is shown from different perspectives in the plurality of images provided. Object capturing is performed by applying an object tracking; e.g., to a video frame feed to identify individual objects (e.g., packages). This can be achieved using various techniques, such as the neural network YOLO (You Only Look Once), the neural network RTMDet, which is a Real Time Object Detector, and ByteTrack, which is a multi-object tracking algorithm. Object tracking can be incorporated into the multimodal object finder model.

In a second aspect of the method, the multimodal object finder model is trained using a plurality of labeled images provided by the object handling system. Therefore, the object handling system includes the optoelectronic sensor. For retrieval of the first object, the multimodal object finder model uses the trained multimodal vector database; i.e., the trained multimodal embedding space. In this embodiment, the images provided by the optoelectronic sensor of the object handling system are labeled by a text label to obtain the plurality of labeled images to train the multimodal object finder model. Labelling can be performed manually and/or automatically. Labelling may also include bounding boxes and/or pixel level annotations. The text label describes an object as seen in the image. If several objects can be seen in the image, each of these objects is described by the text label. A labeled image includes an image and a text describing the objects seen in the image. Therefore, a text embedding is generated from the text of the labeled image and an image embedding is generated from the image of the labeled image. Generally, labelling allows an object to be identified and distinguished from other objects seen in the image.

Automatic labelling can be performed using a neural network. To automatically describe objects in an image and to automatically label the image, various types of neural networks are generally employed. These can be, for example, region-based convolutional neural networks. YOLO (You Only Look Once) is a real-time object detection method that divides the image into a grid and makes classification and bounding box predictions for each grid cell. In other words, to automatically describe objects in an image, convolutional neural networks are typically used for feature extraction and transformer-based models are used for generating the description. Modern approaches such as transformers (e.g., BERT and GPT) offer advanced solutions for object detection and description.

The step of training the multimodal object finder model further includes preprocessing of the training data; i.e., preprocessing of the labeled images. For the images, this may involve resizing, cropping, normalization and augmentation, whereas for the text labels, this may involve tokenization. For example, normalization of pixel values to a range between 0 and 1 or standardizing to have zero mean or resizing to fixed size input or augmentations like rotations, flips and color adjustments might be used to improve convergence during training.

Tokenization is the process of breaking down a piece of text into smaller units called tokens. These tokens can be as small as characters or as large as words. The primary reason for tokenization is to help machines understand human language by breaking it down into bite-sized pieces, which are easier to analyze. By converting text into tokens, algorithms can more easily identify patterns. This pattern recognition is crucial because it makes it possible for machines to understand and respond to human input.

In an embodiment of the method, where the multimodal object finder model is trained by use of application specific data, the step of providing labeled images by the optoelectronic sensor to train the model includes the step of labelling the images by an image labelling model. Such an image labeling model could be ML Kit provided by Google®. Alternatively, CVAT could be used to at least support the process of labeling of the provided images.

In some images of the provided images, several of the objects are included, where each of the objects is described by the text label in the labeled image. In this case, the multimodal object finder model is adapted so that it can treat multiple objects in a single image as separate objects. Consequently, there is no need to crop the objects out of the image to obtain individual images. However, the image encoder may be configured to generate a corresponding image embedding for each of the objects shown in the image; e.g., as a separate embedding of the respective objects shown in the image or as a common embedding containing embeddings of the various objects shown in the image as respective embeddings in an accessible form.

To localize several objects in an image, the objects are segmented in the images, thereby providing segmented images. A segmented image is further labeled to provide the labeled image, whereas each segmented object of the segmented image is described by its corresponding text label. The labeled image is then used for generating its image embedding. Image segmentation therefore allows each object to be treated separately and thus to generate separate embeddings for each object. Image segmentation is understood as a process typically used to locate objects and boundaries; e.g., curves and lines in images. Image segmentation is the process of, for example, assigning a feature tag to every pixel in the image, such that pixels with the same feature tag share the same characteristics. The output of this type of feature tagging are segmentation masks that represent, in particular, pixel-precise boundary and shape of the different objects in the image.

Alternatively, if several objects are shown together in one image, the image is cropped, thereby providing individual images of each object. The individual cropped images are labeled to provide the labeled images, such that each object is described by its corresponding text label. The labeled images are then used for generating their respective image embeddings. Image cropping therefore allows each object to be treated separately and thus to generate separate embeddings for each object.

In a third aspect of the method, the multimodal object finder model includes a first neural network for generating image embeddings and/or a second neural network for generating text embeddings. In order to integrate the different modalities provided, image embeddings or feature vectors are generated by the first neural network, which might be a convolutional neural network (CNN) or vision transformer (ViT), as non-limiting examples, and which is part of or is an image encoder. Further, text embeddings or feature vectors of the text label are generated by the second neural network, which therefore is part of, or is, a text encoder that processes the text data of the text label into a vector representation; i.e., into the feature vector.

An "embedding", as used herein, is understood to be a transformation of data into a continuous vector space, whereas the data is provided to the first or the second neural network, depending on the data's modality. The multimodal object finder model maps the image and the text data provided by the labeled images into the shared embedding space, which is shared in the sense that similar data are close to each other regardless of their modality; i.e., images of objects are close to similar text labels describing the objects in the images. The goal is that the multimodal embedding space represents a single, coherent representation that captures the relevant features from the visual and textual modalities.

If a CNN is used as an image encoder, the CNN typically includes convolutional layers to apply filters to the input images to detect various features, like edge structures, textures and patterns, whereas each filter slides over the image and performs convolutions to produce feature maps. After convolution, an activation function may be applied to introduce non-linearity into the image encoder, enabling the CNN to learn more complex patterns. Pooling layers reduce the spatial dimensions of the feature maps while retaining the most important information. Pooling layers may include max pooling; i.e., selecting the maximum value from a patch, average pooling; i.e., selecting the average from a patch. After several convolutional and pooling layers, fully connected layers serve to flatten the output feature maps into a single vector; i.e., the embedding. The embedding or the feature vector therefore is a vector representation of the input image capturing its essential features. This may include the step of aggregating the image embeddings from multiple cropped images of the same package by a tracking ID, which creates a single, robust feature vector representation for each package that captures its visual appearance across multiple views or variations.

In a fourth aspect of the method, the first neural network and the second neural network are jointly trained to generate the image embeddings and the text embeddings in the multidimensional embedding space. During training, mapping of the image and text embeddings into the multimodal embedding space is made by jointly training the first and the second neural network; e.g., the aggregated package feature vectors have to be mapped in the multimodal vector database.

Joint training of the first and the second neural network can be performed by optimizing a shared similarity function in order to adjust the weights of both networks; i.e., the first and the second neural network, accordingly. Therefore, the shared similarity function must be a metric that works for both text and image embeddings. Common metrics include, for example, cosine similarity. The cosine similarity is the dot product of two vectors normalized by the product of their norms, whereas the dot product value ranges between −1 and 1, with 1 indicating perfect similarity and −1 indicating perfect dissimilarity. Joint training therefore uses, for example, a contrastive loss, which brings the text and image pairs closer together that match semantically and pushes dissimilar pairs apart. A way of implementing a contrastive loss can be, for example, to calculate during training in a first step the positive distance between the provided similar image text pairs and in a second step the negative distance between the provided dissimilar image text pairs, each by use of the dot product metric. In a third step, the loss function optimization takes place, where the dot product of the positive pairs is maximized and the dot product of the negative pairs is minimized, considering a predefined threshold in the latter case, which defines the minimum distance between negative pairs.

In a fifth aspect of the method, the multimodal object finder model is a pretrained model. The method may integrate several commercial or open-source tools and frameworks, including "CLIP" (Contrastive Language-Image Pretraining), as an example, for vision-language pretraining, any compatible vision-language model (VLM) with similar architectures and training objectives can be employed within this system without fundamentally altering the invention. The invention may further integrate "ByteTrack", as an example, for object tracking, and vector databases for efficient similarity search, to identify objects using solely their textual descriptions. The choice of the vector database, such as FAISS, is optional and can be replaced by any efficient similarity search library. FAISS contains algorithms that search in sets of vectors of any size up to ones that possibly do not fit in RAM. In FAISS, the data structure is an index, which is a mapping created during an initial process called indexing. This index is then used for efficient similarity search during both training and inference phases. FAISS returns not just the nearest neighbor, but also the $2^{nd}$ nearest, $3^{rd}$, . . . , $k^{th}$ nearest neighbor.

In sixth aspect of the method, the multimodal object finder model is trained using at least one of on-site in a processing unit of the handling system, a processing unit of an edge device connected to the object handling system, or in a cloud. The term "cloud" refers to a network of remote servers hosted on the internet that store, manage, and process data, rather than using a local server or a personal computer, in other words to a cloud-based application.

Therefore, training of the multimodal object finder model is optionally based on application specific data; i.e., application specific labeled images or may additionally be based on application specific labeled images after deployment of the multimodal object finder model. In other words, if the multimodal object finder model is pretrained by use of labeled images, the provided labeled images (i.e., application specific labeled images) of the optoelectronic sensor are preferably used for application specific training after deployment. After training, the inference is performed by doing a forward pass of the provided images by the optoelectronic sensor through the image encoder to generate an image embedding; i.e. a feature vector.

Therefore, in a seventh aspect of the method, the multimodal object finder model is fine-tuned using a plurality of images from the object handling system that are each annotated with a label describing objects shown in the respective images. The term "fine-tuned" refers to a training after deployment of the model; i.e., when the model is pre-trained.

In an eighth aspect of the method, the image embeddings are combined using a common tracking ID. In other words, the image embeddings and the corresponding text embeddings of the same object's images are combined into a single embedding. Consequently, different views of the same object are combined with each other, and their corresponding text descriptions are combined accordingly.

By combining embeddings (i.e., feature vectors) with their respective common tracking ID, the method advantageously enables more robust and accurate text-to-image similarity search for lost object identification, even in challenging scenarios with variations, occlusions, or temporal changes. When combining the image embeddings, different views, variations, or deformations of the object are captured, providing a more comprehensive representation of its visual appearance. It mitigates the impact of partial occlusions by considering information from crops where the object is more visible. It even can incorporate multi-scale information if the cropped images are obtained at different scales or resolutions.

Alternatively, the labeled images derived from the images are combined using a common tracking ID. In other words, the images are combined before the embedding step. In this case a search query will match one or more images of the same object, thereby creating redundancy in the search results. Consequently, the different images of the same object have different similarity scores.

In a ninth aspect of the method, the common tracking ID is obtained from computer vision-based object detection and tracking, or alternatively from optical code reading, in particular barcode reading, or RFID reading or from mailing tag reading.

A system for identifying a first object out of a plurality of objects that have passed an object handling system is further provided. The system includes at least one optoelectronic sensor, which is configured to provide images of the plurality of objects. A first input unit is configured to receive a first object description text describing the first object, and a second input unit is configured to receive the images of the plurality of objects. At least one first data processing unit is configured to generate image embeddings of the images of the plurality of objects by a multimodal object finder model that includes at least one neural network and a text embedding for the first object description. The at least one first data processing unit also performs a similarity search between a text embedding and the image embeddings in an embedding space of the multimodal object finder model, thereby identifying a most similar image embedding among the image embeddings that is most similar to the text embedding. The system also includes an output device configured to output an image and/or a text corresponding to the most similar image embedding as the identification for the first object. It should be understood that the at least one first data processing unit may be any suitable type of processor, computer, programmable logic controller, neural network or the like.

The first input unit is, or may include, a device with which an operator is allowed to enter a description of the first object into the multimodal object finder model. Such a device can be, for example, a keypad, a touch screen, or any other suitable input device that can accept textual information from an operator. In a preferred embodiment, the first input unit includes, or is, a mobile phone.

Accordingly, a second input unit includes, or is, a device or component which is configured for receiving images designed to capture visual information from the environment and convert it into a digital format that can be processed by a computer or other electronic systems. The second input unit may include, or is, a mobile phone.

The first data processing unit (DPU) is preferably a specialized hardware device, or a software framework, designed to process a pre-trained neural network, for example the first and second neural networks, whereas, preferably, the first data processing unit is part of an edge device like the opto-electronic sensor; e.g., a camera. The first DPU is capable of optional application specific training of the first and second neural networks, preferably by use of the provided images by the optoelectronic sensor. In this case, the edge device includes enough computational power to fine-tune the model after model deployment. Therefore, the first DPU is specifically designed to provide high computational power with low energy consumption. Further, the first DPU is preferably small and lightweight to fit into the housing of the edge device, which may require integration on a small form factor, such as a System-on-Chip. The first DPU enables real time processing of image and video data and can load and execute the pretrained first and second neural network, thereby reducing deployment time and simplifying implementation. By processing data directly on the edge device, latency is advantageously reduced and the need to send large amounts of data to central servers is minimized. An example of such a first DPU is the NVIDIA® Jetson Orin.

In an embodiment of the system, the system further includes a second data processing unit. The second data processing unit (DPU) is understood to be a specialized hardware device or a software framework designed to efficiently process data for neural network models, to train and run neural networks by use of labeled images, where a labeled image includes an image and a text describing the objects seen in the image. Therefore, a text embedding is generated from the text of the labeled image and an image embedding is generated from the image of the labeled image.

The second DPU therefore may serve to train the first and second neural networks before deployment, whereas deployment refers to the process of transferring the trained first and second neural networks into a production environment such that the first and second neural networks can process data; i.e., processing of the images provided by the optoelectronic sensor and to make predictions based on the provided images and the text describing the first object.

An example of a first or a second DPU is a computer; i.e., a system that has the following key components: A processor (CPU/GPU/TPU), where computations are performed. For neural networks, these computations often involve matrix multiplications and other mathematical operations that can be parallelized. Therefore, GPUs (Graphics Processing Units) or TPUs (Tensor Processing Units), which are designed for parallel processing, are often used. A memory where data is stored for quick access during processing. In the context of neural networks, this could include the input data, the weights and biases of the network, and intermediate results from each layer of the network. A storage, a hard drive or solid-state drive (SSD), where data is stored long-term, including the training data, the trained model, and any output data. The speed of the storage can significantly impact the efficiency of training and running neural networks. A network interface, which allows the system to communicate with other systems, which is essential for distributed processing. In the context of neural networks, this could be used to distribute the training process across multiple systems. Software, including the operating system that manages the hardware resources, drivers that allow the software to interact with the hardware, libraries and frameworks, like TensorFlow, PyTorch, etc., that provide functions for designing, training, and running neural networks. The first or second DPU processes data by performing a series of operations defined by the neural network model, such as convolutions, activations, pooling, and normalization.

The goal of training is to adjust the weights and biases of the network to minimize the difference between the network's output and the expected output. Once the network is trained, it can be run on new data to make predictions or classifications. The first or second DPU can be standalone devices, or they can be integrated into other hardware, such as within a CPU or GPU. In an embodiment, the first and second DPU may form a single device. The output device may be a computer display, a printer, an image-forming or display device, or the like. In a preferred embodiment, the output device includes, or is, a mobile phone.

In a first aspect of the system, the first input unit is configured to receive the first object description provided by a mobile-based application, thereby initiating a retrieval request. A mobile-based application, or mobile app, is to be understood to be a computer program or software application designed to run on a mobile device, such as a phone, tablet, or watch. Mobile applications often stand in contrast to desktop applications, which are designed to run on desktop computers, and web applications, which run in mobile web browsers rather than directly on the mobile device.

The retrieval request may proceed as follows: The user (e.g., a customer) enters the description of the object to be found into the search bar of the mobile-based application and presses "Search". Thereupon, the app creates an HTTP request that contains the user's search query. This request is sent to the server of the application operator; i.e., generally the company that operates the object handling system. The data is usually transmitted as URL parameters or in the request body. In the next step, the server of the mobile app operator receives the request and extracts the user's search query. The server then performs the search in its vector database to identify the object being searched for.

In a second aspect of the system, the output device includes a graphical interface configured to display the image and/or text corresponding to the most similar image embedding in a web-browser and/or mobile-based application. To continue with the example described above, once the server has identified the object being searched for, it creates an HTTP response that contains the information about the object being searched for. This response is sent to the mobile app on the user's mobile phone. The mobile app on the user's mobile phone receives the response from the server and displays the information about the object being searched for.

In a third aspect of the system, the graphical interface is also configured to be prompted by the first object description for retrieving the first object, thereby additionally serving as the first input unit. In a further preferred aspect, the user can provide feedback via the mobile app installed on the mobile phone. Based on the provided feedback, the presented search results (e.g., a ranked list with images and/or text corresponding to the most similar embedding for the first object) can be used to improve performance of the system, in particular of the multimodal object finder model.

In a fourth aspect of the system, the at least one optoelectronic sensor may be a LIDAR, a camera, a camera-based code reader, a neuromorphic camera, or a 3D camera.

The above method may be, at least partially, implemented using a computer program product, which includes instructions which, when the program is executed by a computer, cause the computer to carry out the steps of the computer-implemented method.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
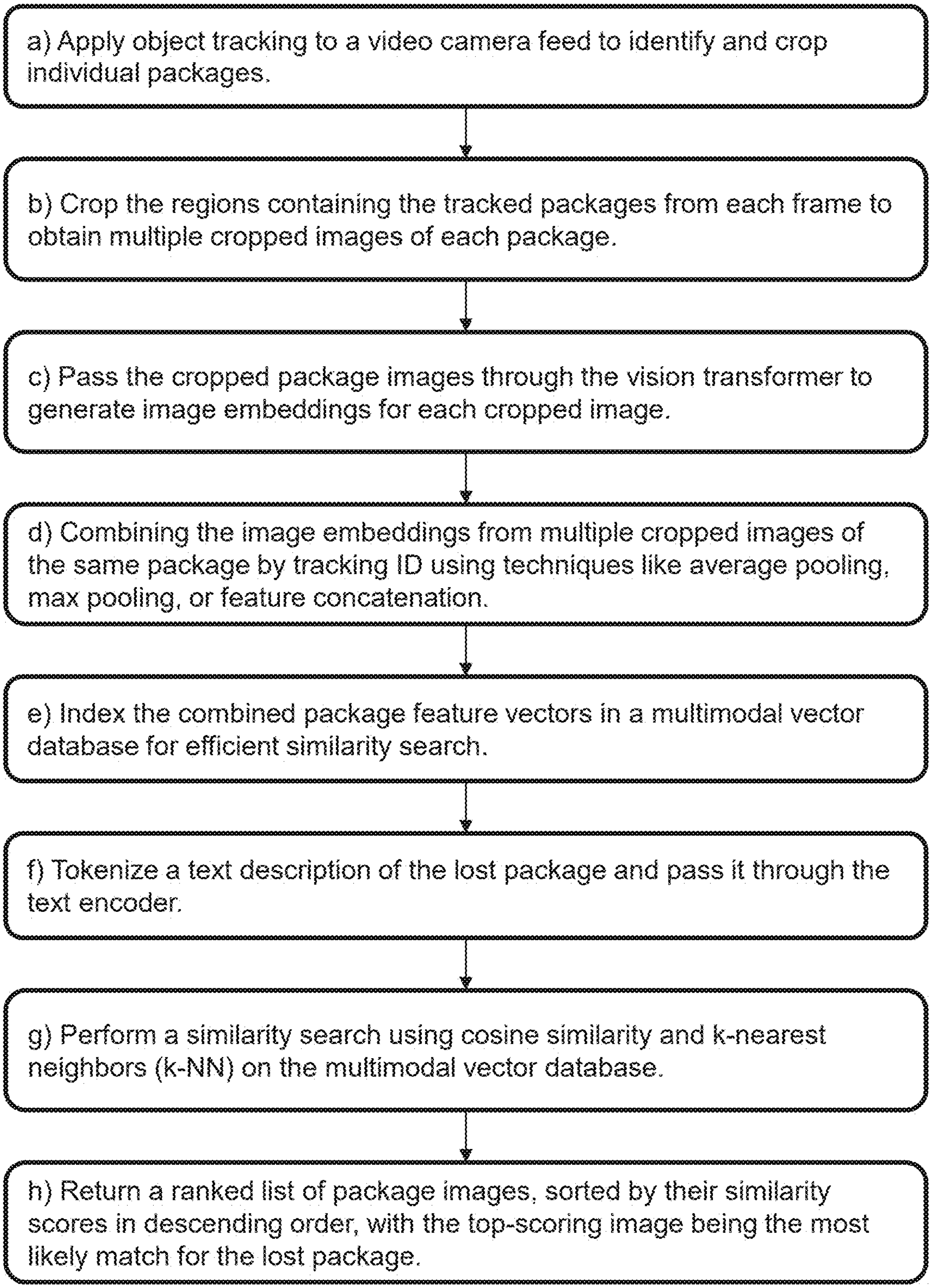
FIG. 1 is a flow chart showing steps of a method for finding a lost package in a package handling system based on a description of the lost package.

FIG. 1 shows a flow chart of an embodiment of the method for finding a lost package 2 in a package handling system 3 based on a customer's description of the lost package 4. Step a) can be achieved using various techniques, such as YOLO or RMTDet for object detection and ByteTrack for tracking, or any other object detection and tracking methods. Step b) refers to the case where several objects 2 are shown and tracked in the same image 6 (i.e., the same image 6 frame) and each of the shown objects 2 is cropped to obtain multiple cropped images 6 of each package 2 from the image 6 frame. It also refers to the case where a single object 2 is shown and tracked in the image 6 frame and the tracked object is cropped to isolate the object from the background and to reduce image size for instance. However, cropping is optional.

In step c) image embeddings 13 are generated through an image encoder 22 or more generally a vision transformer of the neural network. In step d) the combination or aggregation creates a single robust feature representation for each package 2 that captures its visual appearance across multiple views or variations. The aggregation of feature vectors from multiple cropped images 6 of the same package 2 provides several benefits. It captures different views, variations, or deformations of the package 2, providing a more comprehensive representation of its visual appearance. It mitigates the impact of partial occlusions by considering information from crops where the package 2 is more visible. It can incorporate multi-scale information if the cropped images 6 are obtained at different scales or resolutions.

In step e), the inference of the multimodal object finder model 9 takes place. In the present case, the FAISS algorithm is used for indexing; i.e., applying the object finder model to obtain image embeddings which are then inserted into a multimodal vector database 12; i.e., the multimodal embedding space 12. The inference is performed by doing a forward pass through the image encoder to generate a feature vector and adding the vector to the database index.

In step f) the actual search for finding the lost package 1 is made. Therefore, the provided text describing the lost package 4 is converted into an embedding 14 by use of the text encoder 23. In step g) the similarity search is made using the cosine similarity and k-nearest neighbors (k-NN) algorithms on the multimodal vector database 12 to find the aggregated package feature vectors closest to the lost package 1 text embedding 14. The choice of the vector database 12, such as FAISS, is optional and can be replaced by any efficient similarity search library. Also, the similarity search can make use of other evaluations than cosine similarity and k-nearest neighbors (k-NN) algorithms.

In step h) a ranked list of package images is returned, sorted by their similarity scores in descending order, with the top-scoring image being the most likely match 25 for the lost item 1. As used herein, "inference" is understood to be the process of using a trained model to make predictions or decisions based on new, unseen data. In the case where the neural network includes a first 10 and a second 11 neural network, the inference process of the first 10 and second 11 neural networks is carried out on the first data processing unit 18. However, before inference takes place, the neural network (i.e., the first 10 and the second 11 neural networks) have to be trained in a step typically prior to step a). Training is the phase where the first 10 and second 11 neural networks learn from a large dataset. During training, the neural networks 10, 11 adjust its internal parameters (i.e., its weights and biases) to minimize errors in its predictions. Training is done by use of the second data processing unit 29, which preferably is configured as a separate unit. The system preferably includes the second data processing unit 29 for training of the neural network; e.g., the first 10 and second 11 neural network. However, the second data processing unit may also comprise the first data processing unit, thereby forming a single unit.

During training, augmentations like rotations, flips and color adjustments of the images might be used, in particular to improve convergence during training. For example, normalization of pixel values to a range between 0 and 1 or standardizing to have zero mean or resizing to fixed size input. During the training phase, which is analogous to step e) in the inference process, the multimodal object finder model 9 is trained. In this case, the FAISS algorithm is used for indexing, which means creating a multimodal vector database 12, also referred to as the multimodal embedding space 12. This indexing process is a key part of training the object finder model 9. The training optimizes a joint (or shared) similarity function, which applies both a cosine similarity algorithm and a k-nearest neighbor algorithm to the vector database 12.

The model 9 can be trained in-house, so to speak, using application specific data; e.g., data provided by package handling systems 3. Alternatively, and preferably, an already pre-trained model 9 is used. The pre-trained model 9 could be trained on a large dataset for a similar task by use of labeled images, whereas the pre-trained model 9 is transferred using its weights and architecture. The pre-trained model 9 is then fine-tuned on the provided smaller dataset, to better fit the task by use of application specific labeled images 8 provided by the optoelectronic sensor 5.

Figure 2:
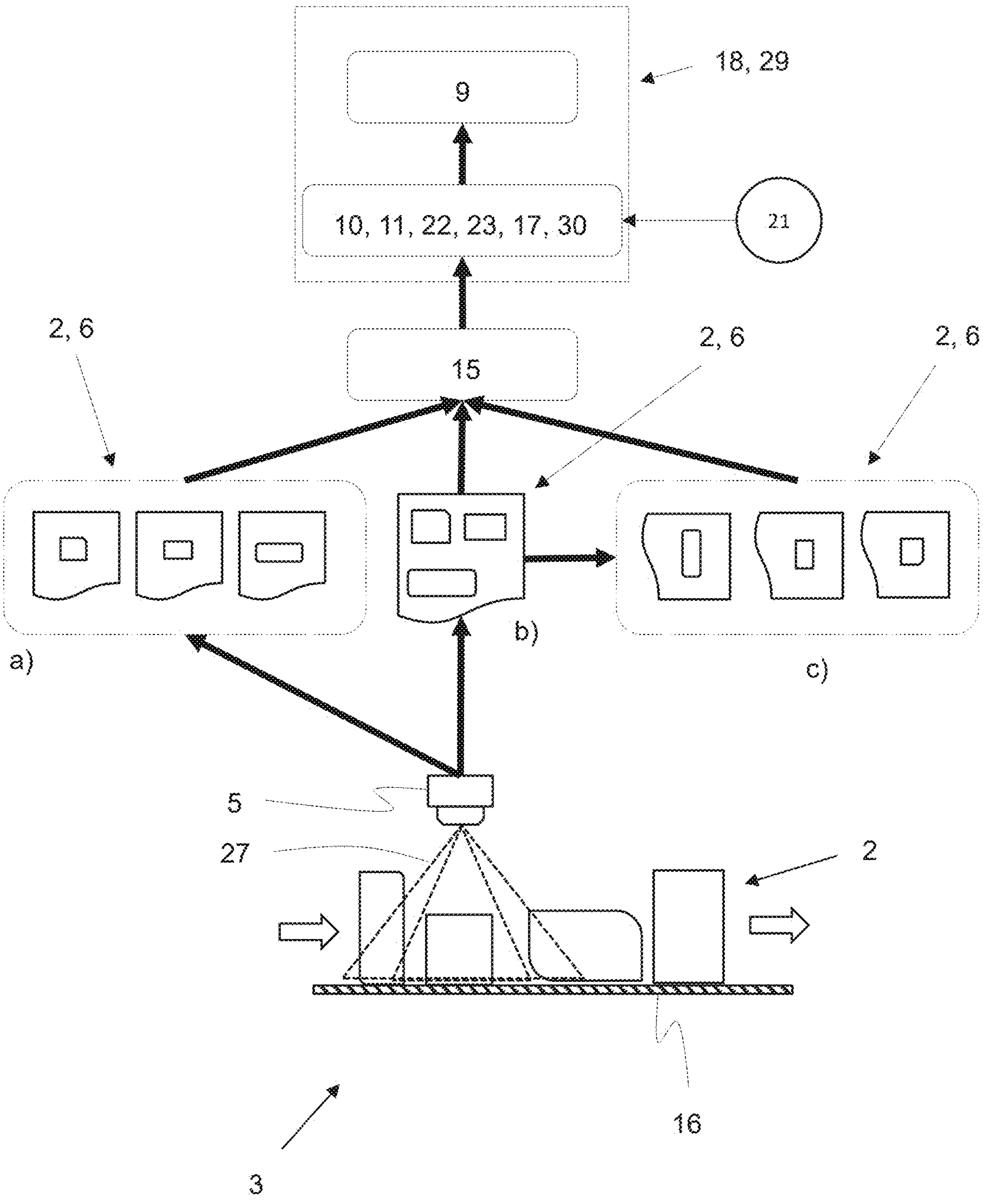
FIG. 2 is a schematic representation of implementation of the method.

In FIG. 2, an embodiment of the method is shown schematically. Packages (i.e., objects 2) are transported on a conveyor belt 16, whereas a RGB camera as an optoelectronic sensor 5 captures images 6 of the packages 2 passing beneath the RGB camera 5. The captured images 6 of the RGB camera 5 are further processed, before being pushed forward through the image encoder 22 to generate the image embeddings 13. FIG. 2 shows three different variants a), b), c) of processing the captured images 6 of the objects 2, whereas the variants can be applied in any combination with each other.

In variant a) the RGB camera 5 captures images 6, whereas each image 6 includes only a single object 2. The images 6 are optionally further processed, which may include resizing, cropping and/or normalization. For example, normalization of pixel values to a range between 0 and 1 or standardizing to have zero mean or resizing to fixed size input.

In variant b) the RGB camera 5 captures images 6, whereas each image 6 comprises several objects 2. If the capturing speed of the RGB camera 6 (i.e., the frame rate) is high compared to the transport speed of the conveyor belt 16, the captured images 6 may comprise the same object 2 from different perspectives as the objects 2 move through the field of view of the 27 RGB camera 5. In FIG. 2, a wide and a narrow field of view 27 of the RGB camera 5 are indicated by dashed lines.

In variant b) the images 6 may be optionally further processed as described in variant a), however, the images are not cropped in variant b). In variant b) the multimodal object finder model 9, in particular the image encoder 22, is therefore trained to process during inference multiple objects 2 in a single image 6 of the images 6. Therefore, the image encoder 22 is trained to recognize the individual objects 2 in a respective image 6. For example, by segmenting the objects 2 prior to the embedding step, such that the objects 2 in the respective image 6 are localizable for the image encoder 22. Image segmentation therefore allows each object 2 of the plurality of objects 2 in an image 6 of the plurality of images 6 to be treated separately and thus allows separate embeddings to be generated.

For training or for fine-tuning, a segmented image is preferably labelled prior to the embedding step to provide the labelled image 8 used by the image encoder 22. Each segmented object of the segmented image is described by its corresponding text label 7. Labelling is made via an image labeling model 15. This can be, for example, a further neural network, configured to generate text labels 7 for images 6. The labelled image 8 is then used to generate its corresponding image embedding 13.

Variant c) refers to the case where an image 6 including several objects 2 is cropped, resulting in individual (i.e., separate) images 6 of a respective shown object 2 of the objects 2. The case is indicated in FIG. 2 by an arrow pointing from the image with several objects 2 shown in variant b) to the images 6 with individual objects 2 shown in variant c). Therefore, for training, each of the individual images 6 are preferably labeled by an image labeling model 15 to provide the respective labeled image 8. The labeled image 8 is then preferably used for generating its corresponding image embedding 13. Image cropping therefore allows each object 2 to be treated separately and thus to generate separate embeddings 13, 14 for each object 2.

As shown in FIG. 2, the image embeddings 13 are combined using a common tracking ID 21. This functionality is indicated in FIG. 2 by a circle 21 which is connected by an arrow to the first 10 and the second 11 neural network in order to exchange the respective tracking IDs 21 with the networks 10, 11. Consequently, different views of the same object 2 are combined with each other and their corresponding text descriptions are combined accordingly. By combining embeddings 13 (i.e., feature vectors) with the respective common tracking ID 21, the method advantageously enables more robust and accurate text-to-image similarity search for lost object identification, even in challenging scenarios with variations, occlusions, or temporal changes. When combining the image embeddings 13, different views, variations, or deformations of the object are captured, providing a more comprehensive representation of its visual appearance. This mitigates the impact of partial occlusions by considering information from crops where the object 2 is more visible. It even can incorporate multi-scale information if the cropped images are obtained at different scales or resolutions.

Alternatively, but not shown in FIG. 2, the tracking ID 21 may instead be used to combine images 6. In this case, a search query will match one or more images 6 of the same object 2, thereby creating redundancy in the search results. Consequently, the different images 6 of the same object 2 have different similarity scores. In this alternative, it is therefore more difficult to search for the lost object 1.

The common tracking ID 21 is obtained from object 2 capturing; i.e., from the computer vision-based object 2 detection and tracking. The optoelectronic sensor 5 captures images 6 of the objects 2, such that an image 6 shows a single object 2 or several objects 2. Object 2 capturing is performed by applying an object 2 tracking; e.g., to a video frame feed to identify individual objects 2, (e.g., packages). Preferably, a neural network such as YOLO (You Only Look Once), which is an advanced real-time object detection method, is used. YOLO divides the image 6 into a grid and makes classification and bounding box predictions for each grid cell. YOLO processes the entire image 6 in a single pass and can process the images 6 at a speed of up to 45 frames per second. The detections from the object detection network are further processed by a multi-object tracking algorithm, such as ByteTrack, to obtain the tracking IDs. The object 2 tracking can be incorporated into the multimodal object finder model 9. As a further alternative, the tracking ID 21 may be obtained from optical code reading, in particular barcode reading, or RFID reading or from mailing tag reading.

After the embeddings 13, 14 have been combined or summarized with the help of the tracking ID 21, in the following step the combined embeddings 13, 14 are passed to the multimodal object finder model 9. The encoder 22, 23 or the first 10 and second 11 neural network may be part of the multimodal object finder model 9, as indicated by the box drawn in dashed lines around the multimodal object finder model 9 and the encoder 22, 23, 10, 11, or they may be separate entities, functionally connected to the multimodal object finder model 9.

Figure 3:
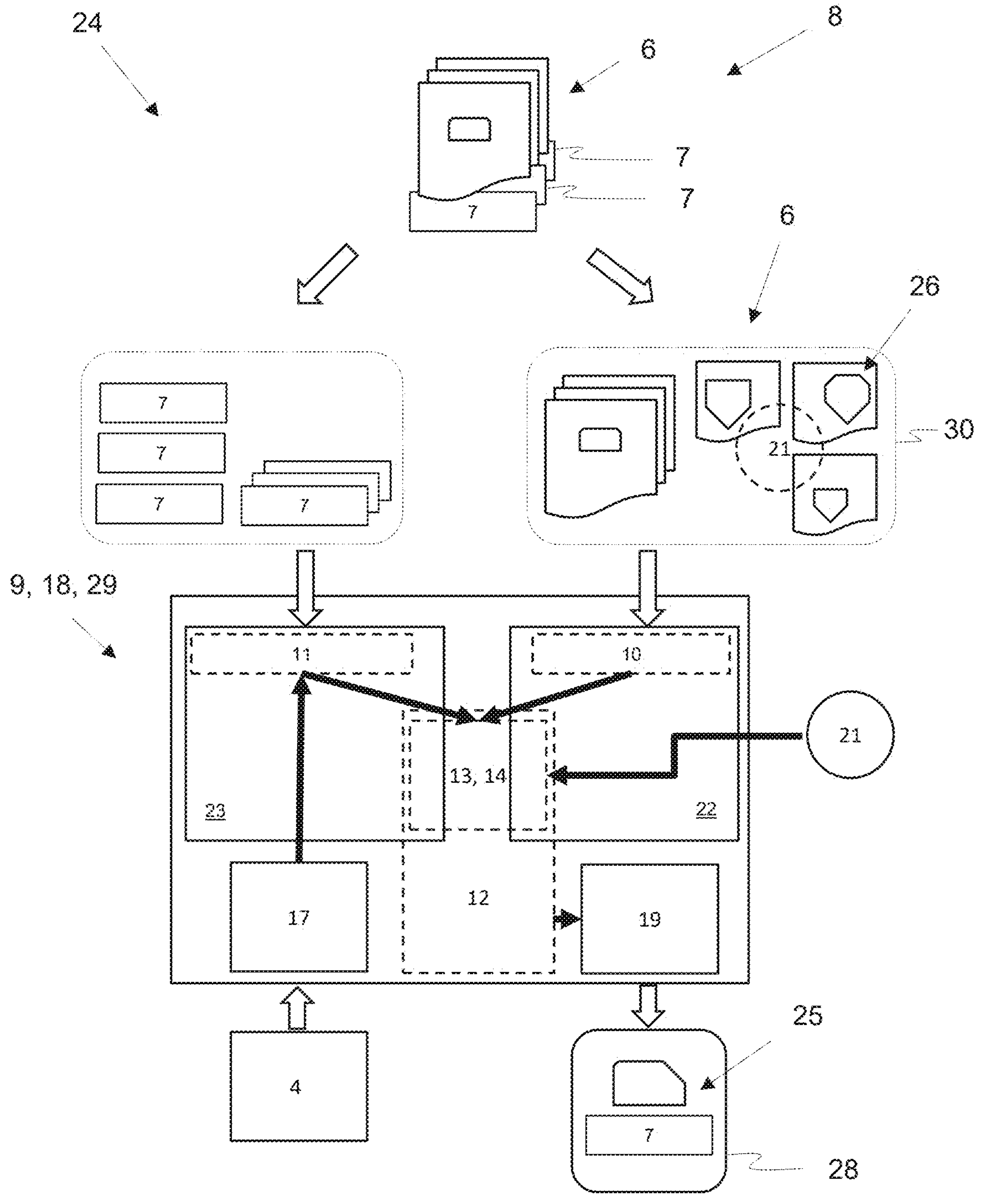
FIG. 3 is a schematic representation of application of the method on a conveyor belt of a package handling system.

FIG. 3 shows a schematic view of the system for identifying the first object 24. The system 24 includes a first 18 and a second data processing unit 29, shown as a common box in FIG. 3, whereas the multimodal object finder model 9 preferably runs on the first data processing unit 18 after deployment. Starting from the top in FIG. 3, during training of the networks, which is exemplarily described in FIG. 3, the labeled images 8 include images 6 of the objects 2 and of their corresponding text labels 7 describing each object 2 seen in each of the images 6. The text labels 7 are passed through the text encoder 23, and accordingly, the images 6 are first preprocessed and then passed through the image encoder 22. However, the step of preprocessing the images 6 is not shown in FIG. 3. The preprocessing step essentially corresponds to the step described as step d) in FIG. 1.

The neural networks 10, 11 are indicated in FIG. 3 as dashed boxes within the respective boxes of the image encoder 22 and of the text encoders 23. The further boxes of the image embeddings 13 or of the text embeddings 14 as well as the box of the embedding space 12 are also shown as dashed lines. Additionally, the boxes overlap with each other. The respective overlap is intended to indicate that the spatially separated representation by the respective boxes does not depict the actual functionality, but only serves to visualize the system 24 as such. In other words, the embedding space 12 is generated by the joint training of the neural networks 10, 11 arranging the respective embeddings 13, 14 in the space 12 or mapping them in this space 12 in such a way that similar embeddings 13, 14 are arranged close to each other and dissimilar embeddings 13, 14 are arranged further apart from each other.

In the next optional step, which essentially corresponds in an analogous manner to the step shown as step d) in FIG. 1 for the inference, the embeddings 13, 14 are preferably also combined using the provided tracking ID 21, as indicated by the circle in FIG. 3, during training.

In the further step, essentially corresponding to the analogue inference step of step e) in FIG. 1, the embeddings 13, 14 are mapped into the embedding space 12 by jointly training the first 10 and the second neural network 11 of the respective encoders 22, 23. Joint training of the first 10 and the second 11 neural network can be performed by optimizing a shared similarity function in order to adjust the weights of both networks 10, 11. Therefore, the shared similarity function must be a metric that works for both text 14 and image 13 embeddings. Common metrics include, for example Euclidean distance, k-nearest neighbors (k-NN) or cosine similarity. The cosine similarity is the dot product of two vectors normalized by the product of their norms, whereas the dot product value ranges between −1 and 1, with 1 indicating perfect similarity and −1 indicating perfect dissimilarity. Joint training therefore uses, for example, a contrastive loss, which brings the text and image pairs closer together that match semantically and pushes dissimilar pairs apart. A way of implementing a contrastive loss can be, for example, to calculate during training in a first step the positive distance between the provided similar image 6 text 7 pairs and in a second step the negative distance between the provided dissimilar image 6 text 7 pairs, each by use of the dot product metric. In a third step, the loss function optimization takes place, where the dot product of the positive pairs is maximized and the dot product of the negative pairs is minimized, considering a predefined threshold in the latter case, which defines the minimum distance between negative pairs. For example, the similarity can be defined as $S(u, v)=u\cdot v$, where u and v correspond to respective text 14 and image 13 embeddings and "•" refers to the dot product. To normalize the similarity to obtain a similarity score, S(u, v) is normalized by their respective vector size; i.e. length, such that $$\text{cosine\_similarity}(u, v) = \frac{u \cdot v}{\|u\|\|v\|}.$$

A common contrastive loss function L can be defined as L=y·(1−cosine_similarity(u, v))+(1−y)·max(0, cosine_similarity(u, v)−m), where y is a binary label, which indicates whether the embedding pair (u, v) 13, 14 is similar (i.e., y=1), or dissimilar (i.e., y=0). Further, m is the margin parameter that defines how far apart dissimilar pairs should be (i.e., the above-mentioned threshold), which defines the minimum distance between negative pairs.

Therefore, for similar pairs, L minimizes (1−cosine_similarity(u, v)), encouraging the cosine similarity to be close to 1. For dissimilar pairs, L maximizes (cosine_similarity(u, v)−m) up to the margin m, encouraging the cosine similarity to be less than m.

In a further step, the trained model is used for identification, and therefore the step essentially corresponds to step f) in FIG. 1. In this step, the text describing the first object 4 is input into the first input unit 17 or the first input device 17. In the embodiment shown in FIG. 3, the first input device 17 is part of the multimodal object finder model 9. A first input device 17 can be, for example, a keypad, a touch screen, or any other suitable input device that can accept textual information from an operator. In a further preferred embodiment, the input device 17 includes a mobile phone or is a mobile phone. The text describing the first object 4 is tokenized and passed through the text encoder 23. Tokenizing is the process of breaking down the text describing the first object 4 into smaller units called tokens. These tokens can be words, sub-words, or even characters, depending on the tokenization method used.

The further steps correspond to steps g) and h) in FIG. 1, referring to the use of the trained model. A similarity search is made between the first embedding obtained for the text describing the first object 4 and the further embeddings 13, 14 of the embedding space 12, using the above defined similarity function. As a result, a ranked list of images 8, sorted by their similarity scores in preferably descending order, with the top-scoring image 25 being the most likely match for the lost object 1. The output device 19 includes a graphical interface 28 (e.g., a display) to display the image 25 corresponding to the most similar image embedding.

Figure 4:
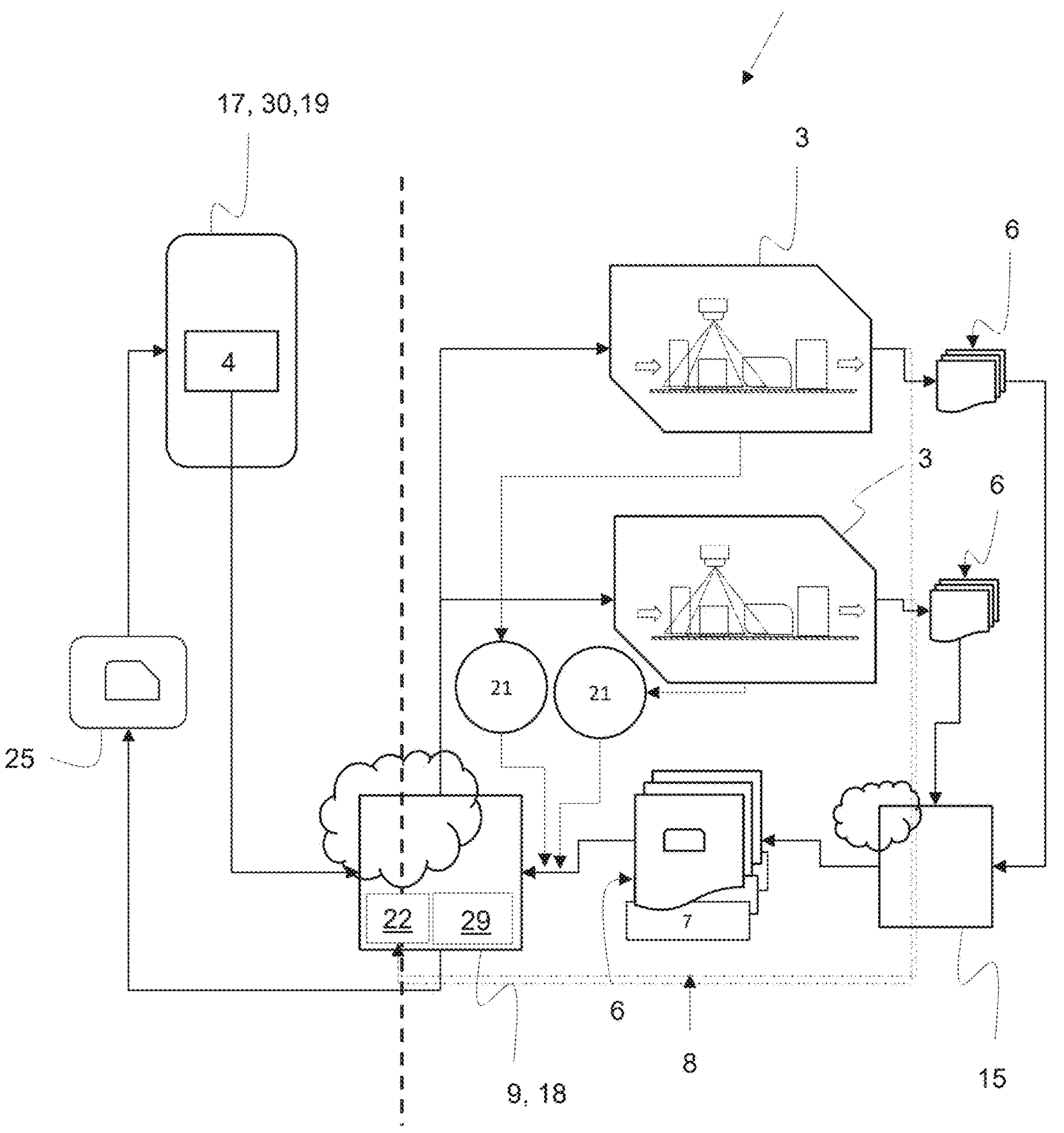
FIG. 4 is a schematic representation of a system for implementing the method.

FIG. 4 shows a schematic view of the system for identifying the first object 24 and refers to the preferred embodiment in which training (e.g., additional training) is performed by using application specific labeled images 8. The system includes two independent package handling systems 3, each having respective RGB cameras 5 and a conveyor belt 16 for transport and sorting of the individual objects 2, according to the package handling system 3 described in FIG. 2. Therefore, for training, each of the package handling systems 3 can send images 6 of the handled packages 2 to an image labelling model 15. The image labelling model 15 forwards the labeled images 8 to the second data processing unit 29, whereas the multimodal object finder model 9 preferably runs on the first data processing unit 18 after deployment from the second data processing unit 29. For sake of simplicity, the second data processing unit 29 is shown in FIG. 4 within the box indicating the first data processing unit 18. However, the first 18 and second 29 data processing units may be separate units and may be located at different locations. For example, the first data processing unit 18 can be the optoelectronic sensor 5 of one of the package handling systems 3. The forwarding of images 6 and/or labeled images 8 or tracking IDs 21 or generally, the forwarding or the exchange of data (i.e., bi-directional), as schematically indicated by arrows in FIG. 4. The forwarding of data or the data exchange occurs at least between the package handling system 3, the labelling model 15, the multimodal object finder model 9, the first and second input units 17, 30 and the output device 19, or generally between the system's components. The data exchange is based on a cloud or any other web-based method. In the embodiment shown in FIG. 4, the multimodal object finder model 9 and the labelling model 15 are cloud based, indicated by the cloud symbol shown in FIG. 4. The first, second input units 17, 30 and the output 19 device is a mobile phone or a mobile based application ("app"). After the training for finding the first object 1, the inference is performed by doing a forward pass from the package handling systems 3 through to the pre-trained object finder model 9 (i.e., the image encoder 22), as indicated by the two dashed lines in FIG. 4.

Therefore, regarding the cloud-based application, the mobile phone 17, 19 serves as a frontend, including the user interface that users interact with; e.g., a mobile app provided by the company that, for example, owns the package handling system. As a backend, the multimodal object finder model 9 and the labelling model 15 run on a common or separate cloud server as the first and/or second data processing unit 18, 29 that handles data processing, and storage. The data exchange between the frontend and the backend is made via APIs (Application Programming Interfaces), whereas the actual data transfer occurs over secure protocols, such as HTTPS, to protect the data during transmission. Data, for example RGB camera data (i.e., images 6), which is either processed or unprocessed, is stored in cloud databases such as Amazon® RDS, Google® Cloud SQL, or Azure® SQL Database. These databases offer high availability and scalability. The same applies to file storage; e.g., storage of a history of search queries, model parameters etc. Further, data is encrypted both during transmission and at rest to protect it from unauthorized access. Strict access controls and authentication mechanisms ensure that only authorized users can access the data. The cloud-based approach advantageously allows automatic scale-up to respond to changes in demand; e.g., a plurality of requests from different package handling systems 3. In other words, the system 24 can use more resources during high traffic and fewer resources during low traffic. Further, advantageously, cloud providers often handle the maintenance and updating of the infrastructure, ensuring the multimodal object finder model 9 is always up to date. Therefore, improvements, for example in the model architecture, can be easily applied. Regular backups and recovery mechanisms ensure that data is not lost in case of a failure. Finally, because the system 24 includes a mobile based app of the input/output device 17, 19, a search query can be submitted from anywhere as long as internet connection is available.

In a preferred embodiment (not shown in FIG. 4), the user can provide feedback via the mobile app and based on the provided feedback, the presented search results (e.g., based on the ranked list with images 25 corresponding to the most similar image embedding) can be used to improve performance of the system 24, in particular of the multimodal object finder model 9. Therefore, in a further aspect of the system 24, the system 24 is adapted to accept more modalities than the actual text modality of the search query; i.e., the text describing the first object 4. Such modalities can be point-clouds of a LIDAR sensor or query images of a camera, a 3D camera, a neuromorphological camera, for image-to-image comparison. Therefore, for example, an image 6 of the object 1 being searched for can be read into the mobile device 17, 19 acting as the first and second input units 17, 30 in addition to the text description 4.

It is to be understood that the package similarity search for lost item identification is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

LIST OF REFERENCE NUMERALS

1 first object
2 object(s)
3 object handling system
4 text describing the first object/a first object description
5 optoelectronic sensor
6 image(s)
7 text label
8 labeled image
9 multimodal object finder model
10 first neural network
11 second neural network
12 embedding space
13 image embeddings
14 text embeddings
15 image labelling model
16 conveyor belt
17 first input unit/first input device
18 first data processing unit
19 output device
20 graphical interface
21 tracking ID
22 image encoder
23 text encoder
24 system for identifying a first object
25 image corresponding to the most similar image embedding
26 views of same object
27 field of view
28 display
29 second data processing unit
30 second input unit
31 edge device/processing unit connected to the object handling system

The invention claimed is:

1. A computer-implemented method for providing an identification of a first object out of a plurality of objects that have passed an object handling system, comprising the steps of:

generating image embeddings of images of the plurality of objects by a multimodal object finder model comprising at least one neural network;

providing a first object description text describing the first object;

passing the first object description text to the multimodal object finder model to generate a text embedding for the first object description;

performing a similarity search between the text embedding and the image embeddings in an embedding space of the multimodal object finder model, the similarity search identifying a most similar image embedding of the image embeddings that is most similar to the text embedding for the first object description; and outputting an image and/or a text corresponding to the most similar image embedding as the identification of the first object.

2. The method according to claim 1, wherein the images of the plurality of objects are captured by an optoelectronic sensor of the object handling system.

3. The method according to claim 1, wherein the multimodal object finder model is trained using a plurality of labeled images provided by the object handling system.

4. The method according to claim 1, wherein the at least one neural network comprises a first neural network for generating the image embeddings and/or a second neural network for generating the text embedding.

5. The method according to claim 4, wherein the first neural network and the second neural network are jointly trained to generate the image embeddings and the text embedding in the multidimensional embedding space.

6. The method according to claim 1, wherein the multimodal object finder model is a pretrained model.

7. The method according to claim 1, wherein the multimodal object finder model is trained using at least one of on-site training in a processing unit of the object handling system, a processing unit of an edge device connected to the object handling system, or in a cloud.

8. The method according to claim 1, wherein the multimodal object finder model is fine-tuned using a plurality of the images from the object handling system, the plurality of the images each being annotated with a label describing objects shown in the respective image.

9. The method according to claim 1, wherein the image embeddings are combined using a common tracking ID.

10. The method according to claim 9, wherein the common tracking ID is obtained from computer vision-based object detection and tracking or, alternatively, from optical code reading, RFID reading or mailing tag reading.

11. The method according to claim 10, wherein the optical code reading comprises barcode reading.

12. A computer software product that includes a non-transitory storage medium readable by a processor, the non-transitory storage medium having stored thereon a set of instructions for performing the computer-implemented method of claim 1.

13. A system for identifying a first object out of a plurality of objects that have passed an object handling system, comprising:

at least one optoelectronic sensor configured to provide images of the plurality of objects;

a first input unit configured to receive a first object description text describing the first object;

a second input unit configured to receive the images of the plurality of objects;

at least one first data processing unit configured to generate image embeddings of the images of the plurality of objects using a multimodal object finder model, the multimodal object finder model comprising at least one neural network and being configured to generate a text embedding for the first object description, wherein the at least one first data processing unit is further configured to perform a similarity search between the text embedding and the image embeddings in an embedding space of the multimodal object finder model, the similarity search identifying a most similar image embedding among the image embeddings that is most similar to the text embedding; and an output device configured to output an image and/or a text corresponding to the most similar image embedding to provide an identification of the first object.

14. The system according to claim 13, wherein the first input unit is configured to receive the first object description provided by a mobile-based application and to initiate a retrieval request.

15. The system according to claim 13, wherein the output device comprises a graphical interface configured to display the image and/or the text corresponding to the most similar image embedding in a web-browser or in a mobile-based application.

16. The system according to claim 15, wherein the graphical interface is further configured to be prompted by the first object description for retrieving the first object, the first input unit comprising the graphical interface.

17. The system according to claim 13, wherein the at least one optoelectronic sensor comprises a LIDAR, a camera, a camera-based code reader, a neuromorphic camera, or a 3D camera.

* * * * *